(12) United States Patent
Fredenberg et al.

(10) Patent No.: US 8,412,870 B2
(45) Date of Patent: Apr. 2, 2013

(54) OPTIMIZED ARBITER USING MULTI-LEVEL ARBITRATION

(75) Inventors: Sheri L. Fredenberg, Windsor, CO (US); Jackson L. Ellis, Fort Collins, CO (US); Eskild T. Arntzen, Cheyenne, WY (US)

(73) Assignee: LSI Corporation, San Jose, CA (US)

( * ) Notice: Subject to any disclaimer, the term of this patent is extended or adjusted under 35 U.S.C. 154(b) by 294 days.

(21) Appl. No.: 12/878,194

(22) Filed: Sep. 9, 2010

(65) Prior Publication Data

US 2011/0296068 A1 Dec. 1, 2011

Related U.S. Application Data

(60) Provisional application No. 61/347,872, filed on May 25, 2010.

(51) Int. Cl.
*G06F 13/368* (2006.01)
(52) U.S. Cl. .......................... 710/119; 710/240
(58) Field of Classification Search .................. 710/119, 710/240–244
See application file for complete search history.

(56) References Cited

U.S. PATENT DOCUMENTS

| | | | |
|---|---|---|---|
| 6,058,063 A | 5/2000 | Jang | 365/189.05 |
| 6,930,949 B2 | 8/2005 | Schaefer | 365/227 |
| 7,379,373 B2 | 5/2008 | Lorenz et al. | 365/226 |
| 7,453,756 B2 | 11/2008 | Moyer et al. | 365/226 |
| 2003/0182486 A1 | 9/2003 | Taylor et al. | 710/305 |
| 2005/0160188 A1* | 7/2005 | Bogin et al. | 710/1 |
| 2006/0088049 A1 | 4/2006 | Kastein et al. | 370/462 |
| 2007/0130482 A1 | 6/2007 | Dahan et al. | 713/300 |
| 2008/0162980 A1 | 7/2008 | Dahan et al. | 713/601 |
| 2009/0307406 A1* | 12/2009 | Aleksic et al. | 710/306 |
| 2010/0057962 A1* | 3/2010 | Okada | 710/113 |

OTHER PUBLICATIONS

JEDEC Standard, Double Data Rate (DDR) SDRAM Specification, JESD79E, JEDEC Solid State Technology Association, May 2005, 85 pages.
JEDEC Standard, DDR2 SDRAM Specification, JESD79-2C, JEDEC Solid State Technology Association, May 2006, 119 pages.
JEDEC Standard, DDR3 SDRAM Standard, JESD79-3, JEDEC Solid State Technology Association, Jun. 2007, 188 pages.

* cited by examiner

*Primary Examiner* — Brian Misiura
*Assistant Examiner* — Kim Huynh
(74) *Attorney, Agent, or Firm* — Christopher P. Maiorana, PC

(57) ABSTRACT

An apparatus comprising a first sub-arbiter circuit and a second sub-arbiter circuit. The first sub-arbiter circuit may be configured to determine a winning channel from a plurality of channel requests based on a first criteria. The second sub-arbiter circuit may be configured to determine a winning channel received from the plurality of channel requests based on a second criteria. The second sub-arbiter may also be configured to optimize the order of the winning channels from the first sub-arbiter by overriding the first sub-arbiter if the second criteria creates a more efficient data transfer.

19 Claims, 12 Drawing Sheets

| QWORD ADDRESS BITS | DWORD ADDRESS BITS | DDR WORD ROW/COL/BANK BITS |
|---|---|---|
| 00b | 00b | COLUMN[1:0] |
| 2:0 | 3:1 | COLUMN[4:2] |
| 5:3 | 6:4 | BANK[2:0] |
| 10:6 | 11:7 | COLUMN[9:5] |
| 25:11 | 26:12 | ROW[14:0] |

FIG. 8

| QWORD ADDRESS BITS | DWORD ADDRESS BITS | DDR WORD ROW/COL/BANK BITS |
|---|---|---|
| 0b | 0b | COLUMN[0] |
| 2:0 | 3:1 | COLUMN[3:1] |
| 5:3 | 6:4 | BANK[2:0] |
| 11:6 | 12:7 | COLUMN[9:4] |
| 26:12 | 27:13 | ROW[14:0] |

FIG. 9

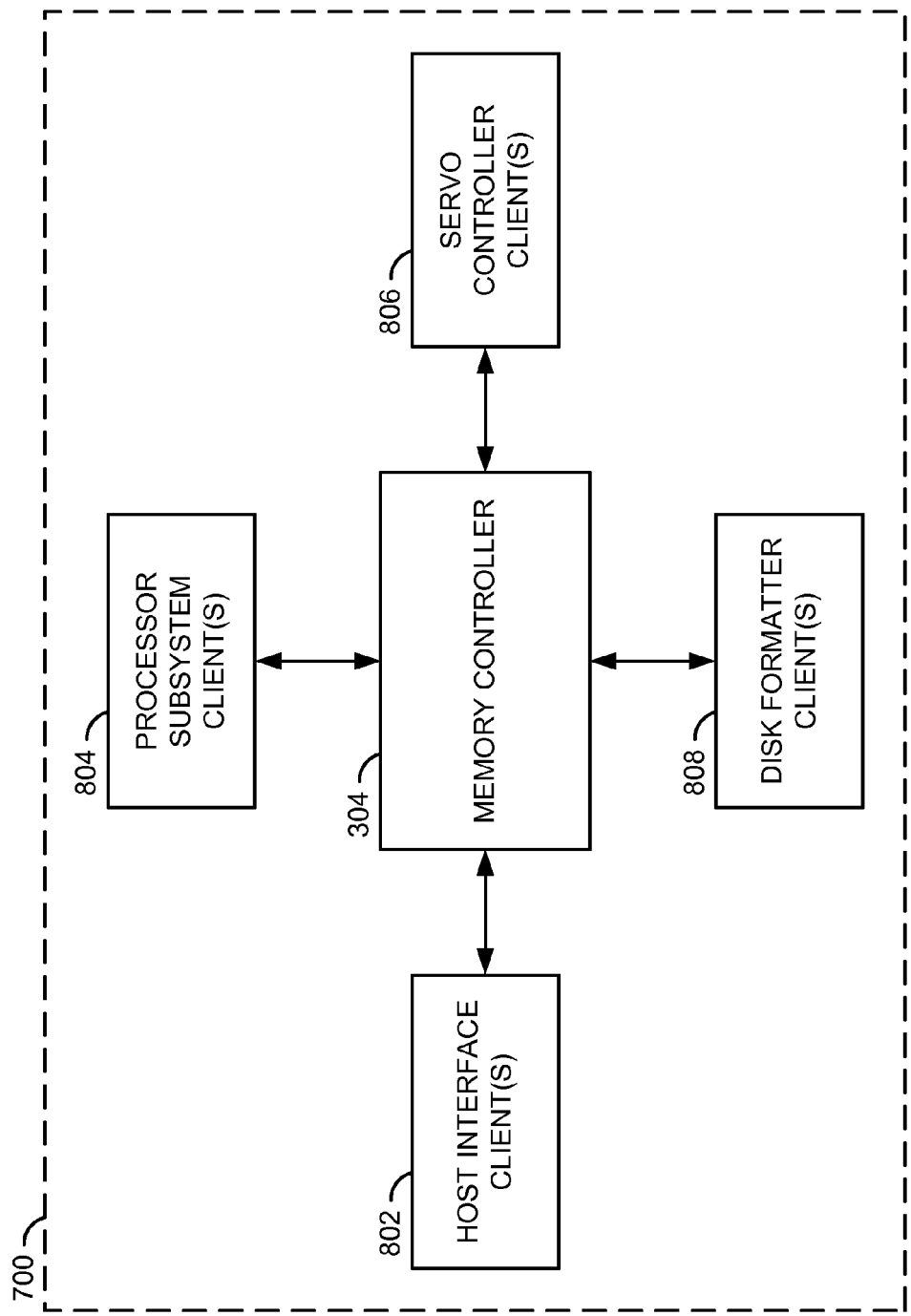

US 8,412,870 B2

OPTIMIZED ARBITER USING MULTI-LEVEL ARBITRATION

This application claims the benefit of U.S. Provisional Application No. 61/347,872, filed May 25, 2010 and is hereby incorporated by reference in its entirety.

FIELD OF THE INVENTION

The present invention relates to arbiters generally and, more particularly, to a method and/or apparatus for implementing an optimized arbiter in a memory using multi-level arbitration.

BACKGROUND OF THE INVENTION

A conventional one-level arbiter decides a winner based on simple priority or a slot-based scheme. In a one-level arbiter, qualities such as priority, minimum or guaranteed latency, fairness and memory bandwidth efficiency result in a large and/or complicated design. A one-level arbiter does not allow intelligent decisions about what is best for the system as a whole for memory accesses.

It would be desirable to implement an arbiter for use with a memory (e.g., a double data rate (DDR) memory) using multi-level arbitration to make arbitration decisions to improve the performance of a memory subsystem.

SUMMARY OF THE INVENTION

The present invention concerns an apparatus comprising a first sub-arbiter circuit and a second sub-arbiter circuit. The first sub-arbiter circuit may be configured to determine a winning channel from a plurality of channel requests based on a first criteria. The second sub-arbiter circuit may be configured to determine a winning channel received from the plurality of channel requests based on a second criteria. The second sub-arbiter may also be configured to optimize the order of the winning channels from the first sub-arbiter by overriding the first sub-arbiter if the second criteria creates a more efficient data transfer.

The objects, features and advantages of the present invention include providing an arbiter that may (i) implement a primary sub-arbiter and a secondary sub-arbiter, (ii) use multi-level arbitration, (iii) be optimized to provide greater than 90% statistical bandwidth efficiency, (iv) provide low or guaranteed latencies for each channel while maintaining statistically high bandwidth efficiency and/or (v) provide a low cost and simple implementation.

Other features of invention may include (i) limiting access to a quantum size per access per requester per arbitration cycle, (ii) implementing directional optimization (to maintain writes and/or reads for as long as possible), (iii) reducing bank collisions by optimizing accesses based on banks and closing used banks as soon as possible, (iv) keeping track of resource usage on a per requester basis within a window of time, (v) allowing frequent switching between multiple requesters, (vi) providing register to register interface to channel clients, and/or (vii) a router module which funnels a data path associated with a plurality of channels before reaching the arbiter.

BRIEF DESCRIPTION OF THE DRAWINGS

These and other objects, features and advantages of the present invention will be apparent from the following detailed description and the appended claims and drawings in which:

FIG. 8 is a memory address table for an 8-bank 16-bit DDR column;

FIG. 9 is a memory address table for an 8-bank 32-bit DDR memory column;

FIG. 12 is a block diagram of a hard disk controller.

DETAILED DESCRIPTION OF THE PREFERRED EMBODIMENTS

Figure 1:
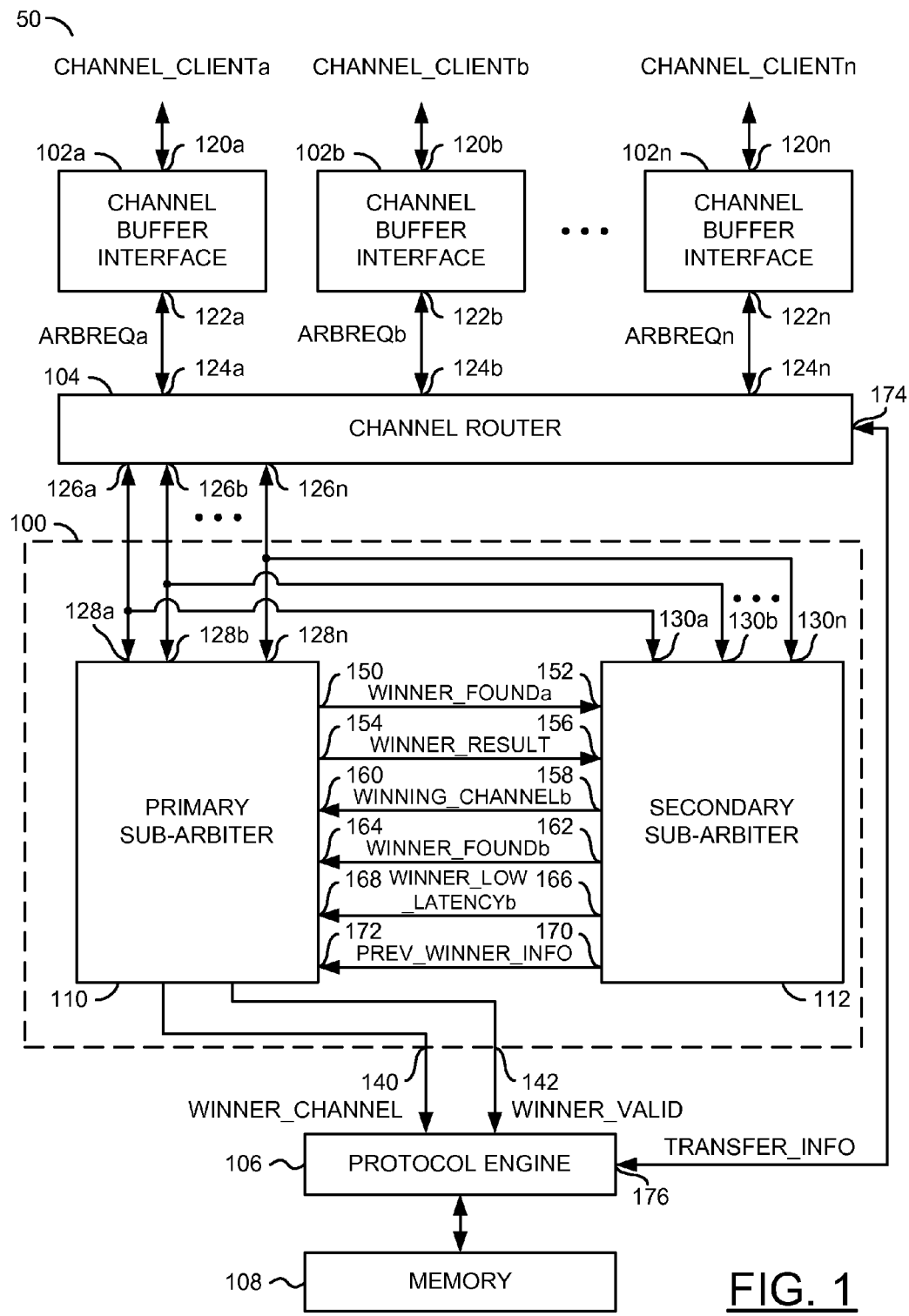
FIG. 1 is a block diagram of a preferred embodiment of the present invention.

Referring to FIG. 1, a block diagram of a system 50 is shown in accordance with the present invention. The system 50 generally comprises a block (or circuit) 100, a plurality of blocks (or circuits) 102a-102n, a block (or circuit) 104, a block (or circuit) 106 and a block (or circuit) 108. The circuit 100 may be implemented as a quantum burst arbiter circuit. The circuits 102a-102n may be implemented as channel buffer interface circuits. The circuit 104 may be implemented as a channel router. The circuit 106 may be implemented as a protocol engine. The circuit 108 may be implemented as a memory circuit. The circuit 100 may include a block (or circuit) 110 and a block (or circuit) 112. The circuit 110 may be implemented as a primary sub-arbiter circuit. The circuit 112 may be implemented as a secondary sub-arbiter circuit.

The channel buffer interface circuits 102a-102n may each have a respective input/output 120a-120n and a respective input/output 122a-122n. The input/outputs 120a-120n may be connected to a number of clients (e.g., CHANNEL_CLIENTSa-n). The input/outputs 120a-120n may receive/present a number of request signals, acknowledgment signals and/or transfer description signals. The transfer description signals may include address and/or read/write data. The channel router circuit 104 may have a number of input/outputs 124a-124n, a number of input/outputs 126a-126n and an input/output 174. The input/outputs 124a-124n may receive/present a number of request signals (e.g., ARBREQa-n), acknowledgment signals and/or transfer description signals. The request signals ARBREQa-n and/or transfer description signals may be passed to the input/outputs 126a-126n of the channel router 104. The input/output 174 may receive/present a signal (e.g., TRANSFER_INFO). The signal TRANSFER_INFO may represent transfer information. The circuit 110 may have a number of inputs 128a-128n that may receive the signals ARBREQa-n. Similarly, the circuit 112 may have a number of inputs 130a-130n that may receive the signals ARBREQa-n. The protocol engine circuit 106 may have an input/output 176. The input/output 176 may receive/present the signal TRANSFER_INFO.

The circuit 100 may have an output 140 that may present a signal (e.g., WINNER_CHANNEL) and an output 142 that may present a signal (e.g., WINNER_VALID). The circuit 110 may have an output 150 that may present a signal (e.g., WINNER_FOUNDa) to an input 152 of the circuit 112. The circuit 110 may also have an output 154 that may present a signal (e.g., WINNER_RESULT) to an input 156 of the circuit 112. The signal WINNER_RESULT may contain both the signal WINNER_CHANNEL and the signal WINNER_VALID (as noted by the oval). The circuit 112 may have an output 158 and may present a signal (e.g., WINNING_CHANNELb) to an input 160 of the circuit 110. The circuit 112 may also have an output 162 that may present a signal (e.g., WINNER_FOUNDb) to an input 164 of the circuit 110. The circuit 112 may also have an output 166 that may present a signal (e.g., WINNER_LOW_LATENCY) to an input 168 of the circuit 110. The circuit 112 may also have an output 170 that may present a signal (e.g., PREV_WINNER_INFO) to an input 172 of the circuit 110.

Figure 2:
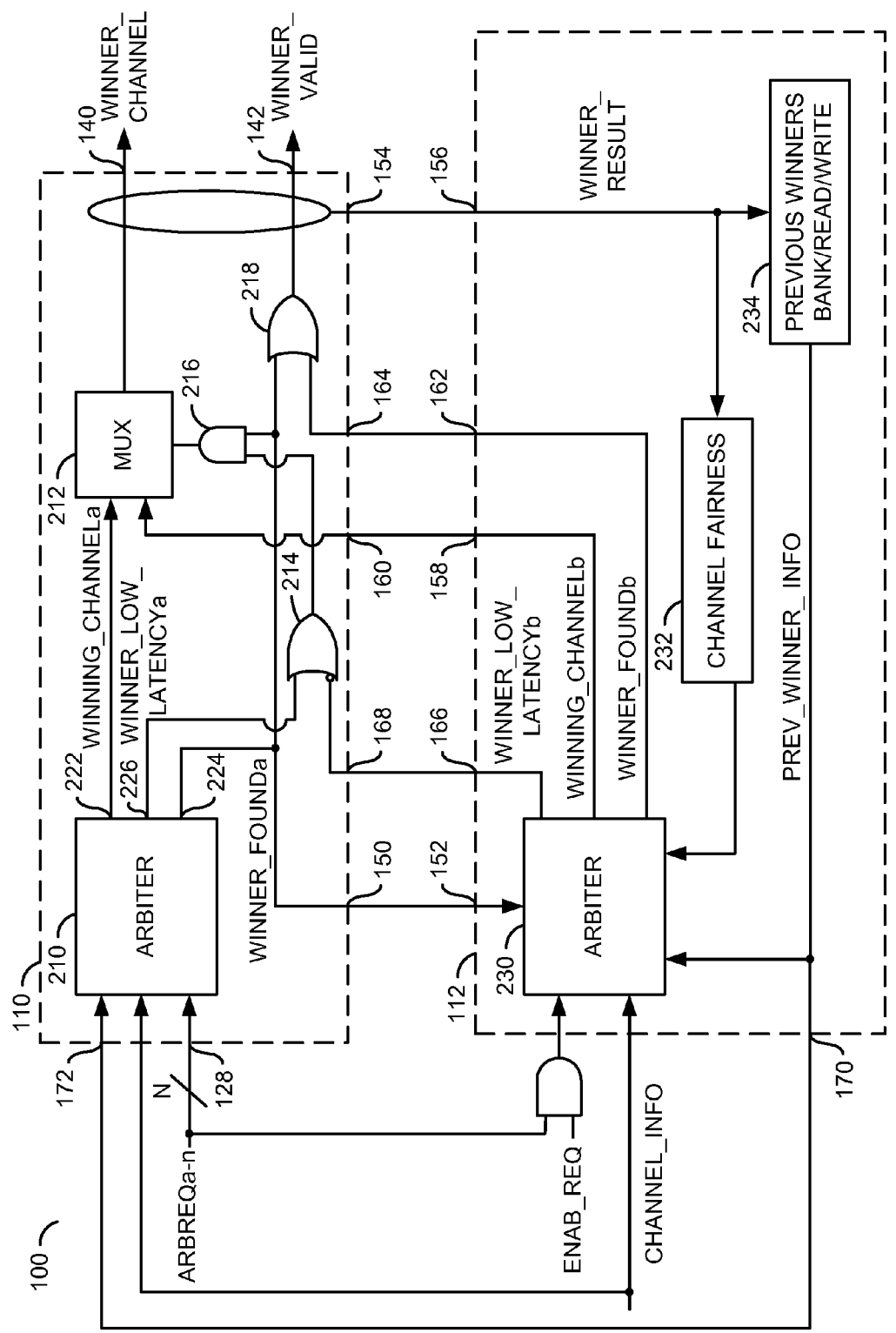
FIG. 2 is a block diagram of a preferred embodiment of a multi-level arbiter.

Referring to FIG. 2, a block diagram of the circuit 100 is shown illustrating additional details of the circuit 110 and the circuit 112. The circuit 110 generally comprises a block (or circuit) 210, a block (or circuit) 212, a block (or circuit) 214, a block (or circuit) 216 and a block (or circuit) 218. The circuit 210 may be implemented as an arbiter circuit. The circuit 212 may be implemented as a multiplexer circuit. The circuit 214 may be implemented as a logic gate. In one example, the circuit 214 may be implemented as an OR gate with an inverted input. However, other logic may be implemented to meet the design criteria of a particular implementation. The circuit 216 may be implemented as a logic gate. In one example, the circuit 216 may be implemented as an AND gate. However, other logic may be implemented to meet the design criteria of a particular implementation. The circuit 218 may be implemented as a logic gate. In one example, the circuit 218 may be implemented as an OR gate. However, other logic may be implemented to meet the design criteria of a particular implementation.

The circuit 112 generally comprises a block (or circuit) 230, a block (or circuit) 232 and a block (or circuit) 234. The circuit 230 may be implemented as an arbiter circuit. The circuit 232 may be implemented as a channel fairness circuit. The circuit 234 may be implemented as a previous winners circuit. The circuit 234 may capture the bank/read/write information of a previous winner.

The circuit 100 may be partitioned into the primary sub-arbiter 110 and a parallel secondary sub-arbiter 112. The primary sub-arbiter 110 and the secondary sub-arbiter 112 may each perform arbitration at the granularity of a quantum burst. A quantum burst (QB) may refer to a sequential burst of data having a fixed length that is aligned to the memory on an address boundary. In a DDR2 SDRAM (Synchronous Dynamic Random Access Memory) implementation, the quantum burst size may be set to 16-DWords. However, other sizes may be implemented to meet the design criteria of a particular implementation. Each quantum burst normally starts and ends on an address that is a multiple of 16-DWords. A DWord generally represents 32-bits. For example, the first quantum burst location in the DDR2 memory may be from DWord address 0 to DWord address 15, the second quantum burst location in the DDR2 memory may be from DWord address 16 to DWord address 31, etc. The lower four DWord address bits may be used to address the specific DWord within each quantum burst. The next two to three DWord address bits may specify the DDR memory bank. Each consecutive quantum burst during a sequential transfer may occur in a different DDR memory bank.

Each buffer channel may send a request signal ARBREQa-n to request a quantum burst of a particular transfer length when the request is set to HIGH. The actual length of the transfer being requested may be less than the quantum burst size. The circuit 100 may accept the entire transfer length being requested, up to a full quantum burst size. The arbiter 100 may present the signal WINNER_CHANNEL identifying the winning channel (e.g., a next channel to begin transferring data to the memory 108) and the signal WINNER_VALID identifying that the arbiter 100 has selected a winner and/or that the signal WINNER_CHANNEL is now valid. The protocol engine 106 may receive the quantum burst transfer length and/or other information in the signal TRANSFER_INFO associated with the valid signal WINNER_CHANNEL from the channel router 104. The protocol engine circuit 106 may support a memory map at the quantum burst boundary with each consecutive quantum burst being located on a consecutive bank. The signals WINNER_CHANNEL, WINNER_VALID and/or TRANSFER_INFO associated with the signal WINNER_CHANNEL may then be utilized by the protocol engine circuit 106 to initiate and execute the protocol to perform the transfer of the winning channel. In one example, the memory 108 may be implemented as an SRAM. In another example, the memory may be implemented as an SDRAM. The particular type of memory may be varied to meet the design criteria of a particular implementation.

The circuit 100 may optimize the order of the signal WINNING_CHANNEL to increase the efficiency of the protocol engine circuit 106. The circuit 100 may provide consecutive winners that access different banks of the memory 108. Providing consecutive winners may allow the protocol engine interface circuit 106 to bank interleave the quantum bursts so that the quantum burst may continue data transfer with minimal gaps between transfers. For example, if two consecutive quantum bursts contain the same bank destination, then the protocol engine interface circuit 106 may close the bank after the first quantum burst and then open the same bank for the second quantum burst. In such an example, processing two consecutive quantum bursts may incur some overhead. Such overhead may be one of a number of types of overhead that the arbiter 100 may be configured to optimize. Another type of overhead may occur during a write/read direction change. Each write/read direction change may incur a gap of a few clocks between data transfers. The circuit 100 may provide optimization by finding a winner that is in the same write/read direction as the previous winner and/or has a different bank within the memory 108 than the previous winner.

The secondary arbiter 112 may employ fairness, bank/write/read optimization, and/or fixed priority to select the next winner. The winner of the secondary arbiter 112 may be the winner if either the primary arbiter 110 does not have winner, or if the winner of the primary arbiter 110 is not bank optimal but the winner of the secondary arbiter 112 is bank optimal.

The channel fairness block 232 may implement a count and a fairness threshold per client. The microprocessor (to be described in connection with FIG. 12) may assign fairness thresholds to each channel as either always fair, never fair, or fair until threshold N. If a fairness threshold N is assigned, then the client may be given a higher priority until the client has won N times. A lower priority may be assigned until all of the fairness counters are reset. Fairness counters may be reset when there are no fair requests left. The fairness counters may be located in the channel fairness block 232. The fairness counters may keep track of the number of times each client has won. When a particular client is not fair, such a client may generally only win if other fair channels are not requesting. An exception may exist if a fair request results in a large gap of overhead between the previous transfer and the fair requests transfer. In this case, an unfair but very optimal request may be allowed to win first if the request efficiently fills the gap with a data transfer.

The previous winners bank/read/write block 234 may represent a register element that stores the last winning channel from the arbiter 100. The signal PREV_WINNER_INFO may contain the last winning channel result. The arbiter 230 may compare the signal PREV_WINNING_INFO with each requesting channel bank/read/write state to determine the optimization of the request from the requesting channel. If the requesting channel bank is not equal to the bank in the signal PREV_WINNING_INFO and the requesting channel read/write state is equal to the read/write state in the signal PREV_WINNING_INFO, then the request may be considered optimal. A requesting channel where the bank is equal to the bank in the signal PREV_WINNING_INFO or where the read/write state is not equal to the read/write state in the signal PREV_WINNING_INFO may be considered a last priority. If two or more of the requesting channels have equal priority, the arbiter 230 may break the tie by using a unique priority assigned to each of the channels. The unique priority may be fixed (e.g., defined by how the channel requests are wired into the arbiter) or configurable (e.g., changeable by setting programmed by the microprocessor). The unique priority may also be used to assign the highest unique priorities to the channels in most need.

The result of the bank/read/write optimization and fairness algorithm implemented in arbiter 230 may result in the secondary arbiter 112 providing the most fair and bandwidth optimal choice. The winning channel, if selected as the arbiter 100 winner, may help the memory protocol to be more efficiently executed. However, without the arbiter 110, sufficient priority to meet the strict latency and/or bandwidth requirements for certain clients may not be met. The arbiter 110 may be coupled with the arbiter 112 to achieve the more strict latency and/or bandwidth requirements for some or all of the clients. The arbiter 110 may implement an arbitration process that may use a configurable time slice process to meet latency and/or bandwidth specifications.

The circuit 100 may be configured to arbitrate between a plurality of requests to transfer a small amount of data (quantum or quantum burst) per request for any requesting channel. The circuit 100 may receive channel requests for access to the memory 108 and may decide which channel should do the next quantum burst. The circuit 100 may be divided into the primary sub-arbiter 110 and the secondary sub-arbiter 112 which both may be used to evaluate channel requests to determine a winning channel on each arbitration cycle. The primary sub-arbiter 110 may use the highest priority criteria based on time slice priority set in a programmable register to select a winner. If a winner is not chosen by the primary sub-arbiter 110, the secondary sub-arbiter 112 may be used to evaluate lower-priority criteria. Such criteria may include bank optimization, read/write optimization, fairness and/or fixed priority.

The arbiter 110 and the arbiter 112 may select a winning channel on a regular interval, referred to as the arbitration cycle. Each arbitration cycle may be multiple clock cycles. In one example the arbitration cycle may be 4 clock cycles. However, the particular number of clock cycles used may be varied to meet the design criteria of a particular implementation. The 4 clock cycles may occur while the previous winning channels are transferring the quantum burst of data. The protocol engine 106 may use the same number of clock cycles or more as the arbitration cycle to perform each quantum burst transfer. This may allow the arbiter 100 to also use the number of clock cycles from the arbitration cycle without stalling the memory 108. The arbiter 100 may use the clock cycles from the arbitration cycle when presenting the signal WINNER_CHANNEL and the signal WINNER_VALID.

The arbiter interfaces 122a-n and 128a-n may each have registered inputs and outputs (to be described in more detail in connection with FIG. 7).

In general, if the primary sub-arbiter 110 has a winner, then this is the winner from the quantum arbiter 100. One exception may occur when the primary sub-arbiter 110 winner is not optimal from a bank point of view. In such an example, the secondary sub-arbiter 112 may provide a winner for a particular time (e.g., one or more arbitration cycles) so long as this winner is for a different bank. The exception is made to allow the winning channel of the secondary sub-arbiter 112 to take priority over the winning channel of the primary sub-arbiter 110. This may occur if the primary sub-arbiter 110 has a winner that will cause the protocol engine 106 to incur a protocol overhead gap and the secondary sub-arbiter 112 has a winner that can efficiently perform data transfer during such a gap. After such an exception, the primary sub-arbiter 110 may continue since now the protocol overhead may not occur (e.g., if the bank of the primary sub-arbiter 110 is different than the bank of the secondary sub-arbiter).

Fixed priority may be used as the final decision after the channel fairness block 232 and the previous winner bank/write/read block 234 optimization have narrowed the choices. One example of an order of evaluation may be fairness, then bank/write/read optimization, and then fixed priority. However, other orders may be implemented. Examples may be implemented where bank optimization is selected over both the winner of the primary sub-arbiter 110 and the fairness choice to fill in a gap that an inefficient bank would have left as unused.

In one example, the size of the quantum burst may be set to be large enough that the previous bank may be closed and re-opened to a different row while the current transfer is in-progress. Such sizing may allow all banks except one (e.g., the active bank for the current transfer) to be available after each transfer. The larger size may be implemented using larger FIFOs which may have larger latencies. The quantum burst size may be determined based on a system performance/cost trade-off based on the statistical activity that the arbiter 100 will encounter from the clients CHANNEL_CLIENTa-n and/or the overhead present in the protocol for closing and/or opening a new bank in the memory 108. If the quantum burst size is set slightly smaller than the ideal size, then one additional bank (e.g., the bank of the previous transfer) may see a small overhead when the arbiter 100 selects this bank to follow the current transfer. Such a statistical performance loss may be acceptable since other system parameters (e.g., latency, FIFO size, etc.) are minimized. Simulation modeling may be used to optimize different combinations of arbitration and/or quantum burst sizes to determine the overall best system performance trade-off.

The arbiter 100 may be implemented to perform arbitration at the quantum burst granularity. In general, each of the clients CHANNEL_CLIENTa-n may attempt to create data transfers that start and stop on quantum burst boundaries. For example, table entries may be optimized around the size of the quantum burst. DMA transfers may be divided into many quantum bursts with runt bursts (e.g., a burst that is less than a quantum burst size) at the beginning and/or end of long transfers. The arbitration between the clients CHANNEL_CLIENTa-n is generally performed at the quantum burst granularity where a winning one of the clients CHANNEL_CLIENTa-n is queued to the protocol engine circuit 106 to perform one quantum burst. In one example, the circuit 100 may queue up to two of the quantum burst to the protocol engine circuit 106 at a time. The protocol engine circuit 106 may optimize the opening and/or closing of the associated banks for each of the quantum bursts in such a way as to hide the latencies involved. The circuit 100 may also look ahead into the available clients CHANNEL_CLIENTa-n and order the winning clients CHANNEL_CLIENTa-n to allow the protocol engine circuit 106 to frequently have consecutive quantum bursts from different banks and to hide the bank open/close times. A high buffer bandwidth efficiency may result while arbitrating at the quantum burst granularity among the clients CHANNEL_CLIENTa-n. Such a bandwidth efficiency may be achieved by bank interleaving at the quantum burst boundary and/or having the circuit 100 order the winning clients to hide the overhead.

The circuit 100 may provide a bandwidth efficiency of around 90-95% in a system performing typical activity on a number of clients. Such an efficiency is improved from typical efficiencies of conventional systems of around 70-80%. While longer bursts may improve efficiency overall, the circuit 100 provides an improvement over conventional systems regardless of length of a particular burst.

The bandwidth efficiency assumes a statistical request pattern may be received which may allow the arbiter 100 to order requests for high efficiency. For example, DDR memory may have overhead to open and close banks and allow overhead to be hidden by performing open and close actions while a data transfer to a different bank is active. The bank bits may be part of the address that is received with each request from a client. If the quantum bursts are interleaved across the memory banks, then each sequential quantum burst request may be in a different bank than the previous quantum burst request. Therefore, if a channel is requesting multiple quantum bursts that are all sequential to each other, such as a DMA channel, then the arbiter 100 may continue to select requests from the channel. The signal WINNER_CHANNEL and the protocol engine 106 may be able to achieve nearly 100% efficiency transfers using bank interleaving. However, the arbiter 100 may also wish to be fair to other requesting channels. The arbiter 100 may account for all the requests and choose a request in a different bank than the previous request. Given that the bank bits are lower bits in the address bus, a first level assumption may be made that the probability of a given bank being the same as a given previous bank is 1/(the number of banks). For example, if there are 4 banks, the probability is 75% that the next bank will be different from the previous bank. But given that certain channels, such as DMA channels, may provide multiple requests where each consecutive request is sequential and therefore in a new bank, the arbiter has a higher probability than 75%. The arbiter 100 may choose priority over bandwidth efficiency. However, the arbiter 100 may choose other characteristics, such as read/write direction changes that may incur overhead, to optimize the order of winners.

The fairness, priority, and latency characteristics also have a statistical nature to them that may be directed by the arbiter 100 and/or allowed to naturally be optimized by the system. For example, the quantum burst arbiter 100 may allow for smaller FIFOs that cause clients to run out of data after a few number of requests have won arbitration. This characteristic may be used by the arbiter 100 to help provide the fairness and frequent switching between channels to reduce latency. Priority and latency may be forced if necessary. The arbiter 100 may have the ability to efficiently switch at the quantum burst size. Smaller FIFOs may allow for more frequent arbitration winners from other clients. Therefore, the statistical result may be lower latency and high priority for all channels. Settings may select priority to achieve bandwidth specifications requested by clients. The settings may work with the statistical results gained by more frequent quantum burst switching between channels together to provide the needed system performance results.

A pathological case may occur where every request is for the same bank or for alternating read/write direction. A system may be modeled to determine statistical performance using simulations where each channel provides the input request pattern statistically expected. The memory efficiency may be measured with the chosen arbiter characteristics and settings. Other industry standard modeling techniques may also be employed (e.g., spreadsheets) to determine the best settings to statistically trade off memory protocol efficiency with client bandwidth and latency requirements.

Because each arbitration winner normally only performs a single quantum burst of data transfer, switching between the clients CHANNEL_CLIENTa-n may be implemented at the quantum burst boundary. This provides the potential for getting back to a particular one of the clients CHANNEL_CLIENTa-n to continue data transfer sooner than if other clients CHANNEL_CLIENTa-n were doing large data transfers. FIFO sizes may therefore be set to a smaller size. Because FIFO sizes are smaller, the clients CHANNEL_CLIENTa-n will not normally be capable of larger data transfers with the FIFO. Because each of the clients CHANNEL_CLIENTa-n is performing smaller transfers, frequent switches between the clients CHANNEL_CLIENTa-n may occur. The circuit 100 may encourage this further by employing a mixture of priority and/or fairness (or round robin) to distribute the arbitration wins between the channels and still help urgent and/or important clients CHANNEL_CLIENTa-n to win more often. As an example, two of the clients CHANNEL_CLIENTa-n may be DMA clients and may wish to maintain a desired target bandwidth such as 300 MB/s with a memory that is capable of 1000 MB/s. Another of the clients CHANNEL_CLIENTa-n may be a processor client and may wish to execute code at a rate of 50 MB/s, but may have an urgency to keep the code execution running. With the circuit 100, an access pattern such as DMA1 QB, Processor QB, DMA2 QB, DMA1 QB, Processor QB, DMA2 QB may be repeated such that the processor client may never have a latency greater than two QB. The DMA clients may also maintain the desired bandwidth and the DDR accesses may be bank interleaved to maintain a high buffer bandwidth.

The quantum arbiter circuit 100 may be pipelined over several clock cycles, which may allow more time for different arbitration methods to be implemented and still meet timing requirements. In a typical implementation of the circuit 100, all accesses do not necessarily need to be exactly aligned and sized to the quantum burst. As long as most are aligned, the protocol engine interface circuit 106 may hide the overhead, for example, to open and close banks. A burst smaller than a quantum burst does not allow as much time to hide the overhead. As a result, there may be a small loss in efficiency if the next request is to the bank that was transferring data before the current bank. But if the next transfer is to a precharged bank, then there is no loss of efficiency. If the arbiter 100 is unable to prevent consecutive bursts from going to the same bank, then the size of the burst is less important and the full latency to open and close the bank occurs. When multiple clients are requesting (or when DMA clients are requesting) more than one quantum burst request for different banks, then high efficiency may be achieved. In one example, the hardware and/or firmware clients accessing the buffer may create bursts that are 16 DWords. In another example, 8 DWords burst size may be used or any size that does not cross multiple quantum burst address ranges in the DDR. By optimizing the hardware and firmware clients around these boundaries, the memory controller module may optimize the DDR memory bandwidth, latency, and/or overall system performance related to the buffer access component.

High bandwidth efficiency may be achieved in the arbiter 100 and the protocol engine interface 106 for 16 data element burst granularity (referred to as the "quantum" burst size). The DDR memory 108 may be address interleaved across banks at the quantum burst granularity. This may allow consecutive arbiter bursts to start in different banks for high protocol efficiency. Bank 0 for the next quantum burst may be opened while Bank 3 of the current quantum burst is occurring. The arbitration may optimize the order of the client access to allow the bank optimization to frequently occur.

Lower latency and/or lower channel bandwidth specifications may be achieved due to the method for achieving efficiency. As a result, the DMA channels do not need to burst for a long period of time. Instead, the arbiter 100 may interleave all the channels ARBREQa-n at the quantum burst granularity. Therefore, the channels ARBREQa-n do not need to wait as long for the arbiter 100 to switch from the DMA channels, and the DMA channels may use more frequent, smaller bursts rather than infrequent, longer bursts to achieve the required bandwidth. The lower latency characteristic may allow the DMA channels to have smaller FIFOs. The lower latency characteristics may also allow lower cost and/or lower power specifications.

Figure 3:
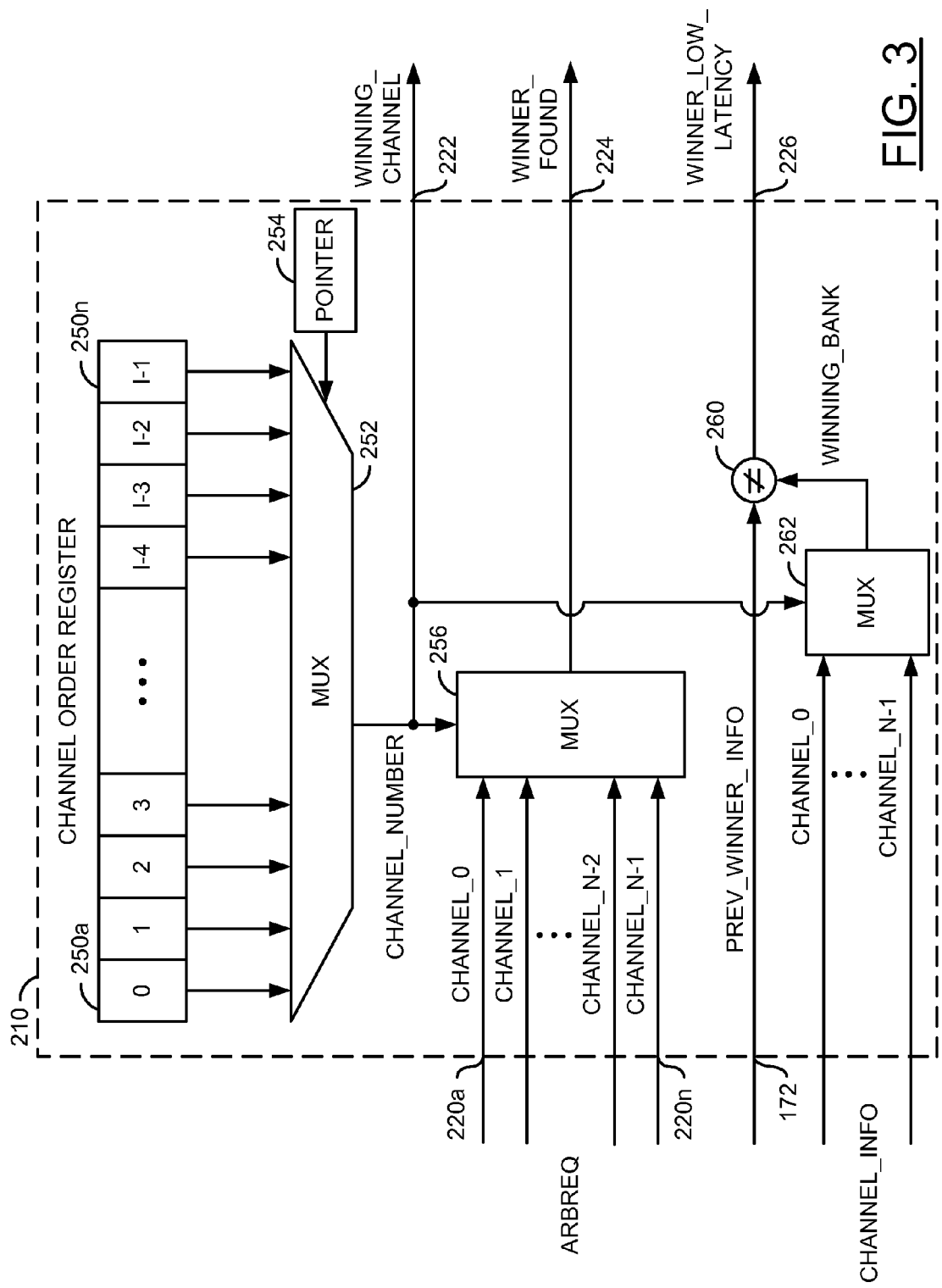
FIG. 3 is a block diagram of a primary sub-arbiter.

Referring to FIG. 3, a block diagram of the primary sub-arbiter 210 is shown. The primary sub-arbiter 210 may implement a time slice process which may allow each arbitration time to be divided between the various clients CHANNEL_CLIENTa-n.

The channel order register 250a-n may be divided into slots (e.g., slot 0 to slot I−1) where each slot may be programmed by a microprocessor. Each slot may have an N-bit number representing an identification number assigned to a particular client. For example, if there are 10 clients with requests to the arbiter 210, then a 4-bit number may be used in each slot to represent one of the clients. A number may also be reserved as the NULL client number. A given slot may be programmed to represent no clients. The pointer 254 may be a counter that increments once per arbitration cycle. The pointer 254 may have a programmable wrap time when wrapping back to zero. The pointer 254 may use the multiplexer 252 to select which slot 250a-n is the current slot for the current arbitration cycle. The multiplexer 252 may present the signal CHANNEL_NUMBER. The signal CHANNEL_NUMBER may represent the current slot for the current arbitration cycle. The primary sub-arbiter 210 may present the signal CHANNEL_NUMBER as the signal WINNING_CHANNEL. The signal CHANNEL_NUMBER may be presented to the multiplexer 256 to select one of the channel requests ARBREQ 220a-n. The signal WINNER_FOUND may be used to represent a requesting channel selected by the slot of the current arbitration cycle. If the channel of the current slot is requesting, then the channel may be the winner of the primary sub-arbiter 210. The signal CHANNEL_NUMBER may be presented to the multiplexer 262 to multiplex between the bank/read/write information for each of the clients. The signal WINNING_BANK may represent the bank/read/write information for the signal WINNER_FOUND. The bank information for the channel represented by the signal WINNER_FOUND may be compared using the comparator 260 against the last bank that won the arbitration from the arbiter 100. The result of the compare may be presented as the signal WINNER_LOW_LATENCY. The signal WINNER_LOW_LATENCY may indicate whether the winner of the primary sub-arbiter will have a protocol overhead or be optimal. The comparator 260 may include a timeout feature which may detect that the last winner occurred long enough in the past and no longer has an influence on the protocol overhead.

At the start of a particular time, the pointer 254 may start at slot 0. Then each time a winner is picked by either the primary arbiter 110 or secondary arbiter 112, or a client is requesting and is blocked from winning, a new arbitration cycle may begin at the next slot 250a-n. The slots 250a-n may be assigned to clients by writing a number into the slot location. In one example, slot 0 through I−1 in FIG. 3 may be assigned to particular clients (e.g., 0, 1, 1, 2, 1, 1, 4, 1, 1, NULL, 1, 1, 2, 1, 1, 5, . . . ). This example generally provides the most bandwidth and least latency to client 1, the next best to client 2, and the least to client 0, 4, and 5. Also, client 1 will have the least latency between the requesting channel, the winning channel and the associated data transfer. The NULL entry may be an open slot that may allow the secondary sub-arbiter 112 to select a winner based on criteria from the secondary sub-arbiter 112.

The number of channel requests ARBREQa-n placed into the primary sub-arbiter 110 may be minimized to allow the process of the secondary sub-arbiter 112 to achieve the throughput and latency goals of the system. In general, the system may assume low latency with the circuit 100. As a result, frequent switching may occur between the different channels. The DMA channels may not require long period of bursts, but instead satisfy bandwidth requirements with frequent small bursts. Other clients generally do not need to wait very long until being inserted into one of these holes between DMA transfers.

Figure 4:
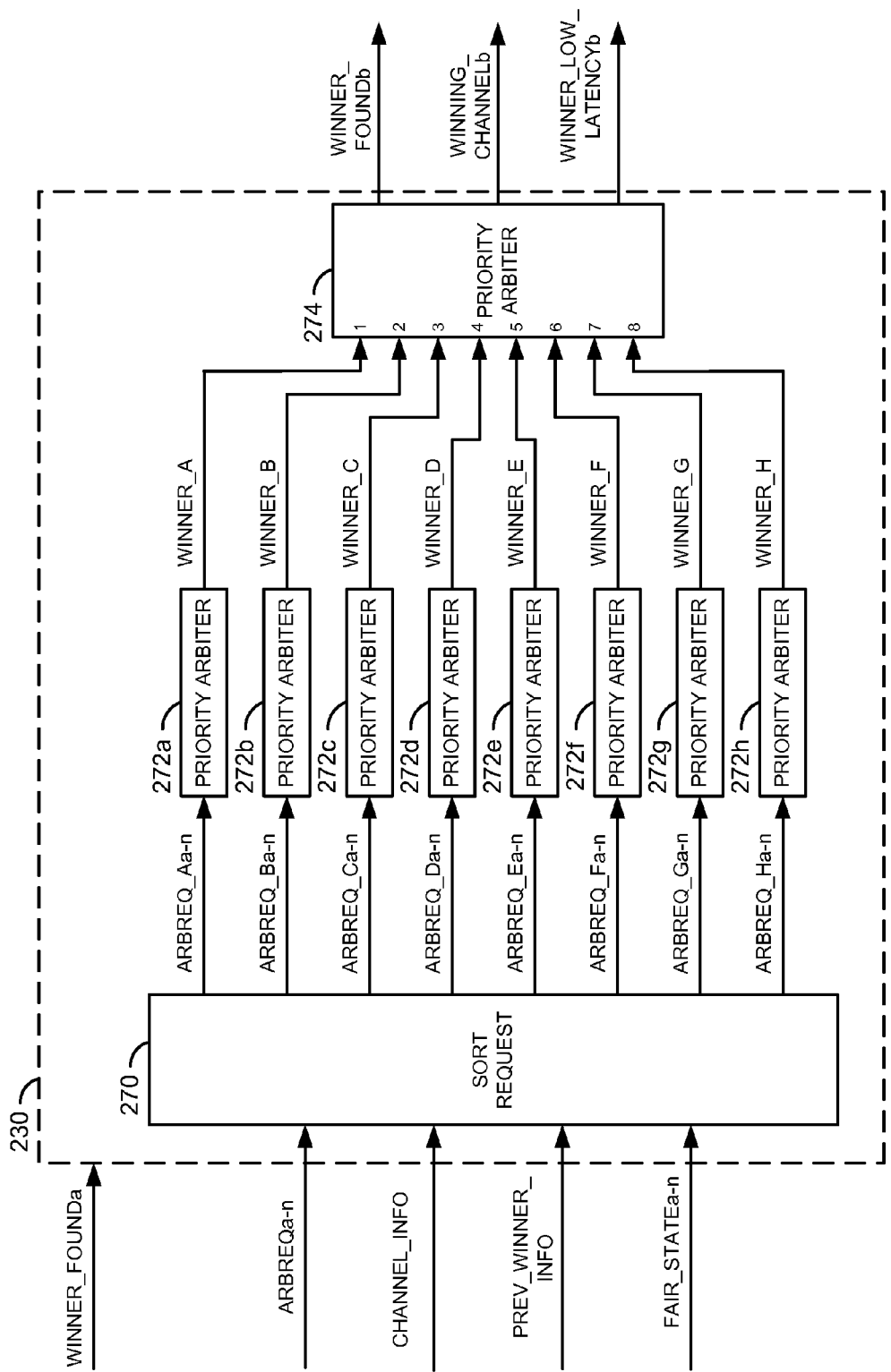
FIG. 4 is a block diagram of a secondary sub-arbiter.

Referring to FIG. 4, a block diagram of the arbiter 230 is shown. The arbiter 230 may determine the winning channel (e.g., WINNING_CHANNELb) from one or more of the input request signals ARBREQa-n based on bank optimization, read/write optimization, fairness and/or priority. The arbiter 230 may comprise a block (or circuit) 270, a plurality of blocks (or circuits) 272a-h and a block (or circuit) 274. The circuit 270 may be implemented as a sort request circuit. The plurality of circuits 272a-h may each be implemented as a priority arbiter circuit. While eight priority arbiter circuits 272a-h are presented, the particular number of priority arbiter circuits may be varied to meet the design criteria of a particular implementation. The circuit 274 may be implemented as a priority arbiter. The sort request circuit 270 may have an input that may receive the signal ARBREQa-n, an input that may receive the signal CHANNEL_INFO, an input that may receive the signal PREV_WINNER and an input that may receive a signal (e.g., FAIR_STATEa-n). The signal ARBREQa-n may contain the requests for each channel. The signal CHANNEL_INFO may contain information about the bank and/or the read/write state of each channel. The signal FAIR_STATEa-n may contain channel information related to determining a fairness of a particular channel.

The sort request circuit 270 may have an output that may present a signal (e.g. ARBREQ_Aa-n), an output that may present a signal (e.g. ARBREQ_Ba-n), an output that may present a signal (e.g. ARBREQ_Ca-n), an output that may present a signal (e.g. ARBREQ_Da-n), an output that may present a signal (e.g. ARBREQ_Ea-n), an output that may present a signal (e.g. ARBREQ_Fa-n), an output that may present a signal (e.g. ARBREQ_Ga-n) and an output that may present a signal (e.g. ARBREQ_Ha-n). The signals ARBREQ_Aa-n through ARBREQ_Ha-n may each be presented, in one example, from the circuit 270 to the circuits 272a-h over a bus. The signals ARBREQ_Aa-n through ARBREQ_Ha-n may each contain a bit representing a particular request transmitted within the signal ARBREQa-n. In one example, each bit of the signal ARBREQ_Aa-n may be set if the associated bit of the signal ARBREQa-n is set, the bank for the channel is different from the signal PREV_WINNER_BANK, the read/write state for the channel is the same as the signal PREV_WINNER and/or the signal FAIR_STATEa-n indicates the channel is a high priority to win based on the fairness algorithm. The channels represented by the asserted bits of the signal ARBREQ_Aa-n may be the most efficient and/or fair channels.

The signal ARBREQ_Aa-n may contain fairness, read/write optimal and bank optimal requests. The signal ARBREQ_Ba-n may contain fairness and bank optimal requests. The signal ARBREQ_Ca-n may contain read/write optimal and bank optimal requests which may ignore the state of fairness. The signal ARBREQ_Da-n may contain bank optimal requests which may ignore the state of fairness. The signal ARBREQ_Ea-n may contain fairness and/or read/write optimal requests. The signal. ARBREQ_Fa-n may contain fairness requests. The signal ARBREQ_Ga-n may contain read/write optimal requests which may ignore the state of fairness. The signal ARBREQ_Ha-n may be a global signal that may contain all requests.

The priority arbiter 272a may have an input that may receive the signal ARBREQ_Aa-n and an output that may present a signal (e.g., WINNER_A). The priority arbiter 272b may have an input that may receive the signal ARBREQ_Ba-n and an output that may present a signal (e.g., WINNER_B). The priority arbiter 272c may have an input that may receive the signal ARBREQ_Ca-n and an output that may present a signal (e.g., WINNER_C). The priority arbiter 272d may have an input that may receive the signal ARBREQ_Da-n and an output that may present a signal (e.g., WINNER_D). The priority arbiter 272e may have an input that may receive the signal ARBREQ_Ea-n and an output that may present a signal (e.g., WINNER_E). The priority arbiter 272f may have an input that may receive the signal ARBREQ_Fa-n and an output that may present a signal (e.g., WINNER_F). The priority arbiter 272g may have an input that may receive the signal ARBREQ_Ga-n and an output that may present a signal (e.g., WINNER_G). The priority arbiter 272h may have an input that may receive the signal ARBREQ_Ha-n and an output that may present a signal (e.g., WINNER_H).

The priority arbiter 272a may be implemented as a priority arbiter that may select the highest priority channel from the channels whose bits are set to a logical high in the signal ARBREQ_Aa-n. The particular method of priority used by the priority arbiter 272a may be hardcoded and/or adjustable by the microprocessor and/or by the state of a particular system. The signal WINNER_A may include an indication that a winner was found. Similarly, priority arbiters 272b-272h may provide similar arbitration for the respective requests ARBREQ_Ea-n-ARBREQ_Ha-n.

The priority arbiter 274 may have an input that may receive the signal WINNER_A, an input that may receive the signal WINNER_B, an input that may receive the signal WINNER_C, an input that may receive the signal WINNER_D, an input that may receive the signal WINNER_E, an input that may receive the signal WINNER_F, an input that may receive the signal WINNER_G and an input that may receive the signal WINNER_H. The priority arbiter 274 may be a priority arbiter that selects the highest priority winner from the signals WINNER_A-WINNER_H. The winner for the priority arbiter 274 may have the highest priority, most optimal bank, and the fairest channel.

The priority arbiter 274 may have an output that may present the signal WINNER_FOUNDb, an output that may present the signal WINNING_CHANNELb and an output that may present the signal WINNER_LOW_LATENCYb. The signal WINNER_FOUNDb may include an indication that a winner was found. The signal WINNING_CHANNELb may indicate the winning channel. The signal WINNER_LOW_LATENCYb may indicate whether the winning channel will have low latency (e.g., there will not be an overhead gap in the protocol). For example, the low latency indication may be set if any bit in the signal ARBREQ_F0 is asserted.

If the priority arbiter 272a determines a winner, then the signal WINNER_A may become the winner for the priority arbiter 274 (e.g., WINNING_CHANNELb). If the priority arbiter 272a does not have a winner and the priority arbiter 272b does have a winner, then the signal WINNER_B may become the winner for the priority arbiter 274 (e.g., WINNING_CHANNELb). If neither the priority arbiter 272a nor the priority arbiter 272b have a winner and the priority arbiter 272c has a winner, then the signal WINNER_C may become the winner for the priority arbiter 274 (e.g., WINNING_CHANNELb). Bank optimization may be prioritized above fairness by the priority arbiter 274 because a non-bank-optimal channel may leave an overhead gap in the memory protocol. Allowing a bank optimal channel to fill the gap may provide improved memory bandwidth. The priority arbiter 274 may prioritize the priority arbiters 272a-h with the priority arbiter 272a as the highest priority and the priority arbiter 272h as the lowest priority. The signal ARBREQ_H presented to the priority arbiter 272h may contain all of the requests which are currently active. Therefore, if any particular channel presents a request to the arbiter 230, the priority arbiter 272h will pick a winner based only on priority and the priority arbiter 274 will present a winning channel. This is in contrast to the primary arbiter 110 which may not present a winning channel during each arbitration cycle during a channel request.

The circuit 270 may be configured to sort a first set of input requests ARBREQa-n received from a plurality of channels. The sort may be based on a first plurality of criteria. Each combination of the sorting using the plurality of criteria may result in a second set of requests ARBREQ_Aa-n through ARBREQ_Ha-n based on the combinations of criteria. The second set of requests ARBREQ_Aa-n through ARBREQ_Ha-n may be independently arbitrated by the priority arbiters 272a-172h to generate the intermediate winning channel WINNER_A-WINNER_H for each of the combinations of criteria. Each of the intermediate winning channels WINNER_A-WINNER_H may become a third set of requests that may be arbitrated by the priority arbiter 274. The priority arbiter 274 may use the combinations of the sorting of the plurality of criteria to produce the final winning channel signal WINNING_CHANNELb. In one example, the combination of criteria may include fairness, bank optimality, read/write optimality, etc. The order of priority may be based on one or more of bank optimality, fairness, read/write optimality, etc. In general, the circuit 230 may always result in a winning channel if there is an input requested by any of the channels. The signal WINNER_LOW_LATENCYb may present an indication of the latency of a particular channel based on which of the criteria the winning channel used. For example, if the winning channel has an optimal bank, then the winning channel may be considered a lower latency winner.

Figure 5:
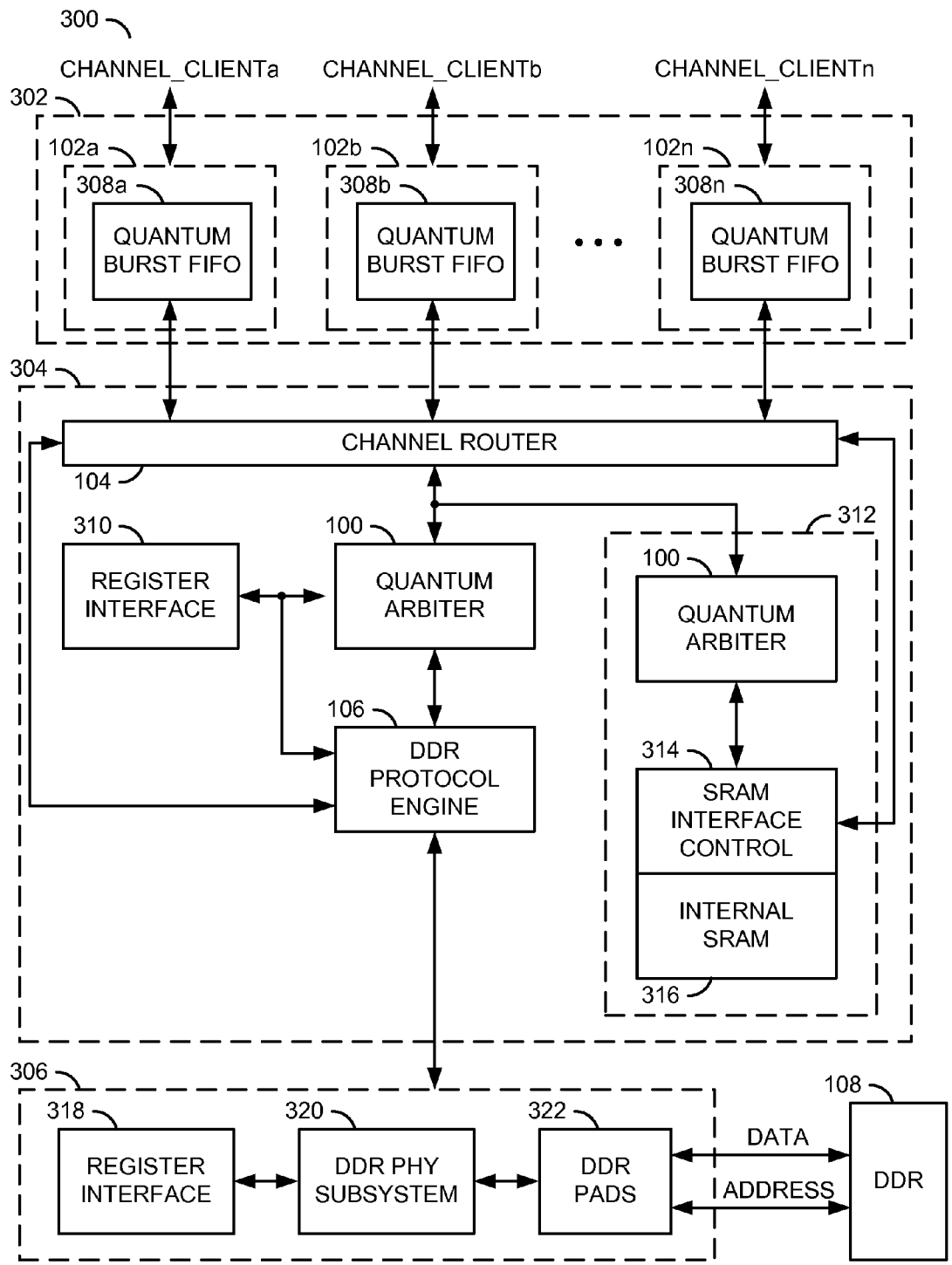
FIG. 5 is a block diagram of a memory controller design with a preferred embodiment of the multi-level arbiter.

Referring to FIG. 5, a block diagram of a memory controller 300 comprising the circuit 100 is shown. The circuit 302 may be implemented as a quantum burst interface circuit. The circuit 304 may be implemented as a memory controller circuit. The circuit 306 may be implemented as a DDR PHY interface circuit. The circuit 302 may comprise the channel buffer interface circuits 102a-102n. Each of the channel buffer interfaces 102a-n may comprise a respective quantum burst FIFO 308a-n. Each quantum burst FIFO 308a-n may provide rate matching to the memory controller module 304 data path and frequency. Each quantum burst FIFO 308a-n may be implemented to have a simple REQ/ACK handshake with each buffer client CHANNEL_CLIENTa-n. Each quantum burst FIFO 308a-n may request access to the quantum arbiter 100 at the quantum burst granularity. The clients CHANNEL_CLIENTa-n may operate at a 32-bit or 64-bit data width and/or at a frequency that provides the lowest power and/or lowest cost for operation.

The quantum burst FIFO 308a-n may be used to provide a common FIFO module that may decouple the quantum burst interface from a simple client interface that may accept transfer requests of any size. The quantum burst FIFO 308a-n may allow the client to transfer data at or slightly above the overall bandwidth requirement. The transfer rate from the client may be slower than the memory 108 transfer rate. This slower operation may allow clients to implement features, such as encryption, with a smaller and/or simpler architecture and still meet the clock cycle setup timing.

The circuit 304 generally comprises the quantum burst arbiter circuit 100, the channel router 104, the DDR protocol engine 106, a register interface circuit 310 and an internal memory controller circuit 312. The internal memory controller circuit 312 may comprise another quantum burst arbiter circuit 100, an SRAM interface control circuit 314 and an internal SRAM memory circuit 316. The circuit 306 may comprise a register interface 318, a DDR PHY subsystem 320 and a DDR pad circuit 322.

The channel router 104 may allow the channels ARBREQa-n to access either the DDR memory 108 or the SRAM memory 316. The channel router 104 may implement a data path for presenting the quantum arbiter 100 transfer information of the winning channel received from the quantum arbiter 100 to the DDR protocol engine 106 or the SRAM interface control circuit 314. The transfer information may include write data, read data, memory address, protection type, length of transfer, write byte enables, write/read indication, and/or read protection error indication. Simultaneous data transfer may be possible with a first channel and DDR memory 108 and/or a second channel and SRAM memory 316. A QWord address bit 27 may be used to differentiate whether a request is for DDR memory 108 or for SRAM memory 316. The channel router 104 may also have physical characteristics for the buffer clients CHANNEL_CLIENTSa-n to reside on the die a long distance from the memory controller module 304 and the DDR PHY 306. These physical characteristics may be created by implementing the routing for each of the clients which may physically reside close in a separate sub-module. This may allow the multiplexing of the close clients to happen first, allowing a single result to be physically routed to the final stage of multiplexing. The quantum burst FIFO 308a-n and the quantum arbiter 100 may each have registered inputs and outputs to allow the multiplexing gates of the channel router 104 to be spread over a large part of the chip. The time necessary for this register to register interface may be acquired by the multi-clock arbitration cycle. Each arbitration may be a quantum burst size amount of data.

The quantum arbiter 100 may decide which requesting channel ARBREQa-n will win (i.e., which channel will be next to transfer to the memory 108 or the circuit 216). There may be one quantum arbiter 100 for SRAM memory 316 and one quantum arbiter 100 for DDR memory 108. These two arbiters may operate in parallel to allow both arbiters to pick a winner simultaneously. The channel router 104 may support simultaneous data transfer between one of the quantum burst FIFO blocks 308a-n and the memory 108 and another one of the quantum burst FIFO blocks 308a-n and the internal SRAM 316.

The quantum arbiter 100 may queue up multiple winning channels as instructions to the protocol engine 106. This may allow the protocol engine 106 to handle multiple channels to efficiently bank interleave at the quantum burst boundary.

The protocol engine 106 may implement DDR1, DDR2, and/or DDR3 protocol compliant with JEDEC standards. The protocol engine 106 may use various programmable parameters to allow support for the full JEDEC range of devices in accordance with various known specifications. Firmware may be used to drive the DDR initialization sequence and then turn control over to the protocol engine 106. The protocol engine 106 may provide periodic refreshes that may be placed between quantum burst accesses. The protocol engine 106 control may support prefetch low-power mode as an automatic hardware initiated mode and self-refresh low-power mode as a firmware initiated mode. The protocol engine 106 may also bank interleave each access with the previous access by opening the bank while the prior data transfer is still occurring. Other optimizations may be provided by the protocol engine 106 to reduce the overhead as much as possible in the implementation of the DDR sequences. The protocol engine 106 may also support ECC coverage of the memory that all of the channels ARBREQa-n may utilize. This ECC coverage may be aligned to the quantum burst boundaries to prevent the quantum burst requests from the quantum burst FIFO 308a-n to be crossed over multiple banks.

The SRAM memory 316 may be connected to the same quantum arbiter 100 as the DDR memory 108. The SRAM quantum arbiter 100 may have the same process options as the DDR quantum arbiter 100 except that the bank/read/write optimization block 234 may not be necessary. Similarly, the SRAM interface control 314 may provide an interface between the SRAM quantum arbiter 100 and the SRAM memory 316. The SRAM memory 316 may be covered by ECC as well.

The SRAM Interface Control 314 may accept one quantum burst command at a time and may perform the SRAM protocol to transfer the data with the internal. SRAM memory 316. The internal SRAM memory may be used to allow for at least twice as much system buffer bandwidth with simultaneous transfer from the internal and external memories. For example, if a 16-bit DDR1-400 system transfers 32-bits every 5 ns, the burst bandwidth without SRAM would be 800 MB/s. The SRAM memory 316 could transfer in parallel with this DDR1-400 at 64-bits every 5 ns for a burst bandwidth of 1.6 GB/s. Together, the DDR memory 108 and SRAM memory 316 may therefore sustain a burst bandwidth of 2.4 GB/s. Both the SRAM memory 316 and the DDR memory 108 may have overhead that reduces effective bandwidth from the burst bandwidth. The SRAM memory 316 is generally smaller, therefore a data structure may be placed into the buffer that may also fit within the DDR memory 108 to take advantage of the SRAM memory 316 speed. This may also be used to reduce the bandwidth requirements on the external memory, resulting in lower system cost and a higher external memory interface margin. The top address bit may be used to differentiate whether each memory controller module 304 arbitration request is for the external memory or for the SRAM memory 316.

The DDR PhyTop subsystem 306 may be implemented as one or more hardmacro memory PHYs, such as the DDR1/2 or DDR2/3 PHYs. The DDR PhyTop subsystem 306 may be interfaced to the external DDR memory 108 through the DDR pads 322. The DDR pads 322 may be standard memory I/F pads which may manage the inter-signal skew and timing. The DDR pads 322 may be implemented as modules that may either be used directly or provided as a reference to customer logic where the pads will be implemented. The DDR pads 322 may include aspects such as BIST pads, ODT, and/or controlled impedance solutions to make the DDR PHY 306 simple to integrate.

The register interfaces 310 and 318 may allow the memory controller module 304 and DDR PHY 306 to reside on an ARM APB3 bus for accessing registers within the subsystem. These registers may or may not directly allow access to the external memory 108 and/or the internal SRAM 316. The client channels ARBREQa-n may initiate writes and reads to the external memory 108 and/or the internal SRAM 316.

Figure 6:
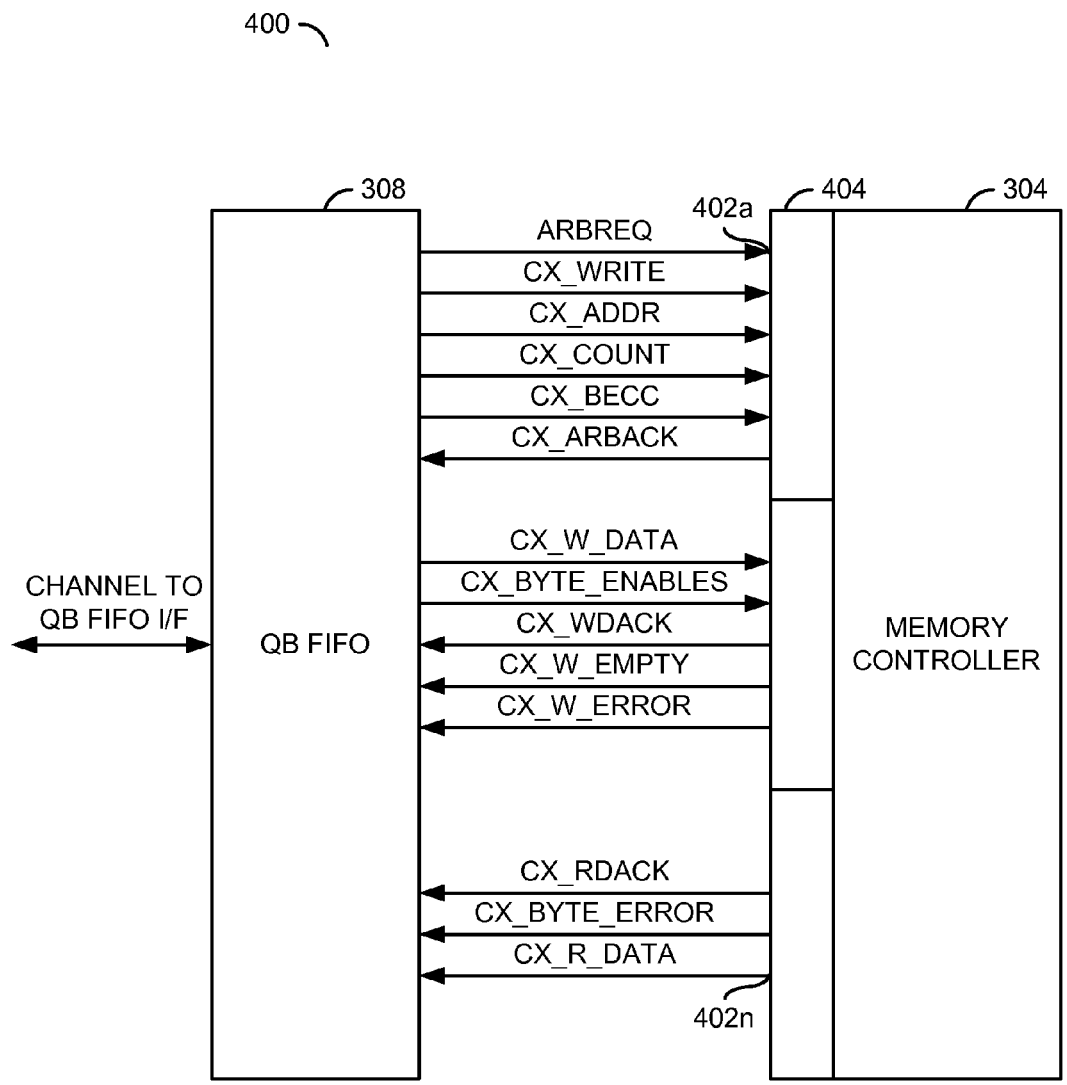
FIG. 6 is a block diagram of a quantum burst interface.

Referring to FIG. 6, a block diagram of a quantum burst interface 400 is shown. The quantum burst interface 400 may comprise the memory controller 304, the quantum buffer FIFO 308, a plurality of signals 402a-n and an interface 404. The quantum burst interface 400 may define the set of signals 402a-n that are provided from the quantum burst FIFO 308a-n associated with each client CHANNEL_CLIENTa-n to the memory controller module 304. The number of the CHANNEL_CLIENTa-n may be a parameter in the memory controller module 304. The signals 402a-n may comprise request signals, write signals, and read signals. The definition of these signals may be the same for each of the clients CHANNEL_CLIENTa-n. At the top level of the design, each client may have a set of signals. These signals may be concatenated together to create the actual I/F to the memory controller module 304 so that the memory controller module 304 may easily parameterize the number of channels by indexing into these concatenated buses.

A QB FIFO 308a-n may be initiated by each client to provide the interface 404 to the memory controller 304. By placing a QB FIFO 308a-n in the client, the QB FIFO 308 may physically be located near to the client and not to the memory controller 304. Such an implementation may be desirable since the interface 404 may be a register to register interface (ignoring the router 104 multiplexors) and improved timing may be easier to achieve. The interface 404 may also implement FPGA partitioning. The QB FIFO 308 may also provide FIFO memory scaled to a multiple of the quantum burst size.

The signal ARBREQ may represent the arbitration request for a client. The signal CX_ARRACK may provide acknowledgment to the signal ARBREQ. The signal CX_WRITE may provide a read/write indication associated with the signal ARBREQ. The signal CX_COUNT may provide a transfer length associated with the signal ARBREQ. The signal CX_BECC may provide ECC protection mode information associated with the signal ARBREQ. The signals ARBREQ, CX_ARBACK, CX_WRITE, CX_COUNT and CX_BECC are generally needed by the memory controller 304 to arbitrate and start the data transfer. Because of the register to register timing, a ARBREQ and CX_ARBACK handshake generally takes 4 clock cycles. However, other clock cycles may be implemented for the ARBREQ and CX_ARBACK handshake to fit the criteria of a particular implementation.

The signal CX_WDACK may be an acknowledge signal which strobes the write data to be transferred from the QB FIFO 308 to the memory controller 304. Because of the register to register interface, writing data in the memory controller after an associated CX_WDACK event generally takes 4 clock cycles. However, other clock cycles may be implemented to fit the criteria of a particular implementation. To compensate for the delay, the memory controller may generate a few CX_WDACK events before the data transfer to prefetch a few write data elements. The CX_W_DATA bus may provide the write data. The CX_BYTE_ENABLES bus may indicate whether each CX_W_DATA byte is valid. The CX_W_DATA bus may include parity. The signal CX_W_EMPTY may indicate when all of the write data for all quantum burst requests that have been acknowledges by the memory controller 304 have been transferred (or nearly transferred) to the memory 108 or the memory 316. The client may use this signal to determine if a request to read the same data is permissible. The arbiter generally will not re-order the read before this write. The client may also use the signal CX_W_EMPTY to determine if the write data parity check has been completed and the result is pending on the signal CX_W_ERROR.

The signal CX_RDACK may be an acknowledgment signal which strobes the read data to be transferred from the memory controller 304 to the QB FIFO 308. The signal CX_R_DATA may provide the read data and the signal CX_BYTE_ERROR may provide an indication for each byte as to whether the internal ECC or other data integrity checks in the memory controller passed or failed on the associated bytes of the CX_R_DATA bus. The signal CX_RDACK may be pipelined through the register to register interface with the signal CX_BYTE_ERROR and the signal CX_R_DATA so that the QB FIFO 308 may capture the read data and error information with the signal CX_RDACK.

Figure 7:
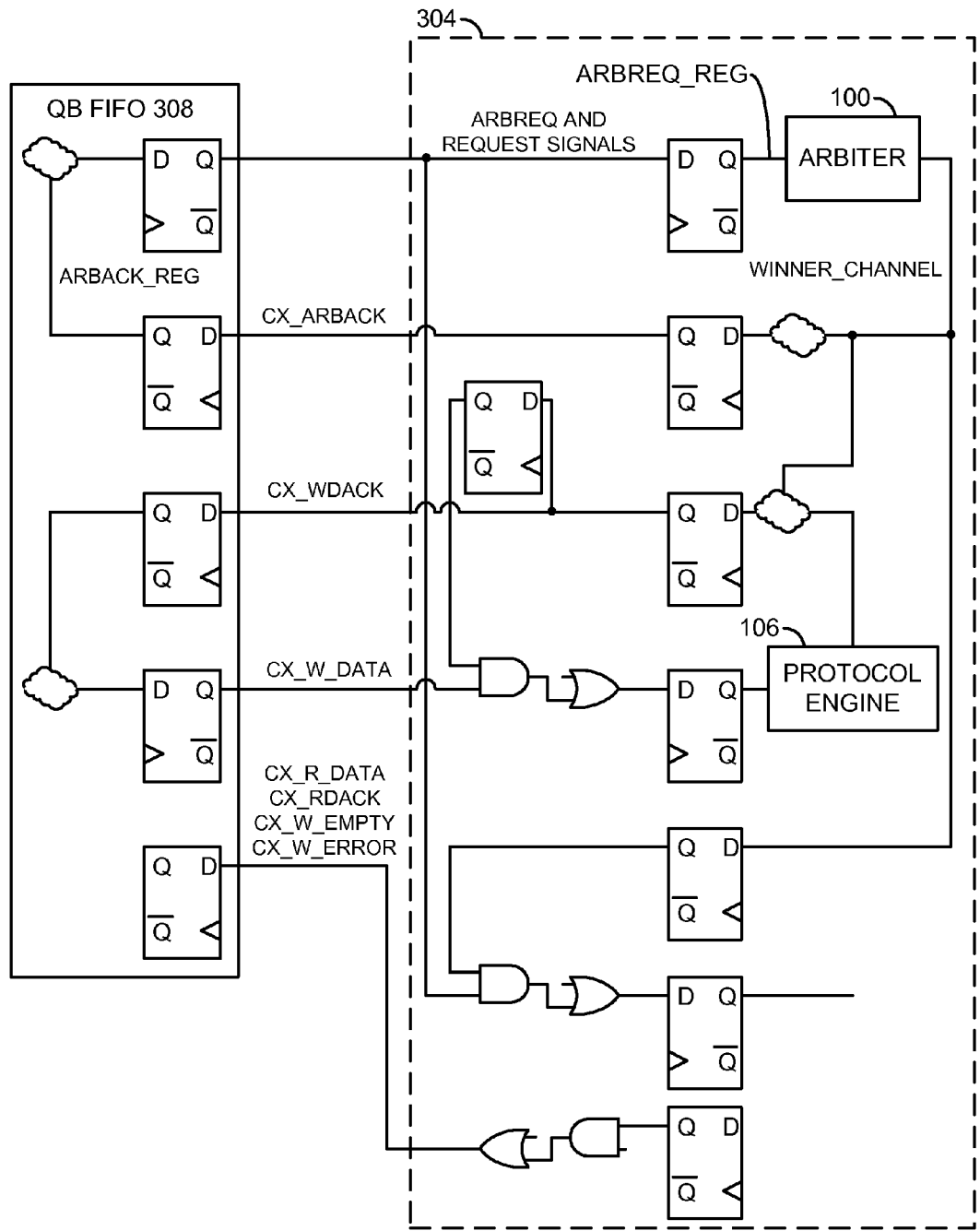
FIG. 7 is a block diagram illustrating register to register timing of the quantum burst interface.

Referring to FIG. 7, a block diagram of a memory controller system is shown. The block diagram shows the register to register timing of the quantum burst interface. FIG. 7 also shows how signals are registered and multiplexed between the QB FIFO 308 and the circuit 304. The channel requests ARBREQ and the associated transfer information may be communicated through the channel router 104 using the register to register interface. After the arbiter 100 picks a winner, the following sequence of signals may occur on consecutive clocks: WINNER_CHANNEL, CX_ARBACK, ARBACK_REG, ARBREQ may deassert or stay asserted, and then ARBREQ_REG with a new arbitration cycle and WINNER_CHANNEL. There may be a four clock cycle time for each arbitration.

The memory controller 304 may be a pipeline architecture. There may be different stages of the memory controller 304 that may be working on different requests, or different parts of the same request, simultaneously. The pipeline architecture may comprise 4 stages:

1. The arbiter 100 may choose the order of requests and generate the signal CX_ARBACK.

2. The protocol engine 106 may receive the requests from the arbiter 100 one by one. The protocol engine 106 may receive up to two requests. If the request is a write, then the protocol engine 106 may generate the signal CX_WRACK to prefetch the first two data elements from the QB FIFO 308 into the memory controller 304.

3. The protocol engine 106 may perform the protocol with the DDR PHY 306. The signal CX_WDACK may be generated during writes.

4. A read FIFO may generate the signal CX_RDACK to return read data to the QB FIFO 308 and verify data protection of read data.

Each of the 4 stages above may be implemented in parallel. Each of the stages may work on a different request. When there is a simultaneous access by the signal CX_WDACK and CX_RDACK, stage 4 may work on a read command while stage 2 or stage 3 may work on a write command. CAS Latency, FIFO/synchronizing delay and datapath delay may cause the signal CX_RDACK to occur after 12 clock cycles. The next command may start before the signal CX_RDACK has occurred to achieve better performance.

Referring to FIG. 8, a table for an 8-bank 16-bit DDR address translation for bank interleaving at the 64-byte boundary is shown. Because a burst length of 4 is used for all DDR transfers, the lower two bits of the 16-bit DDR column always starts at 00b for the start of the DDR burst and then is 10b for the second cycle of the burst.

Referring to FIG. 9, a table for an 8-bank 32-bit DDR address translation for bank interleaving at the 64-byte boundary is shown. The memory controller module may support a 32-bit DDR device pinout.

The 32-bit pinout may provide the largest DDR part supported by the memory controller module (8-Gbit or 1-Gbyte). This is 27 bits when implementing a QWord aligned address bus. Therefore, the QWord address bit 27 may be selected as the bit that selects between SRAM and DDR memory. All address bits passed from the client may be 28-bits when implementing a QWord aligned address bus, 29 bits when implementing a DWord aligned address bus and 31 bits when implementing a byte aligned address bus. A DWord refers to 32-bits and QWord refers to 64-bits. The DDR bank bits may be assigned to the address bits to allow each 64-byte quantum burst to be aligned to a new DDR bank.

Figure 10:
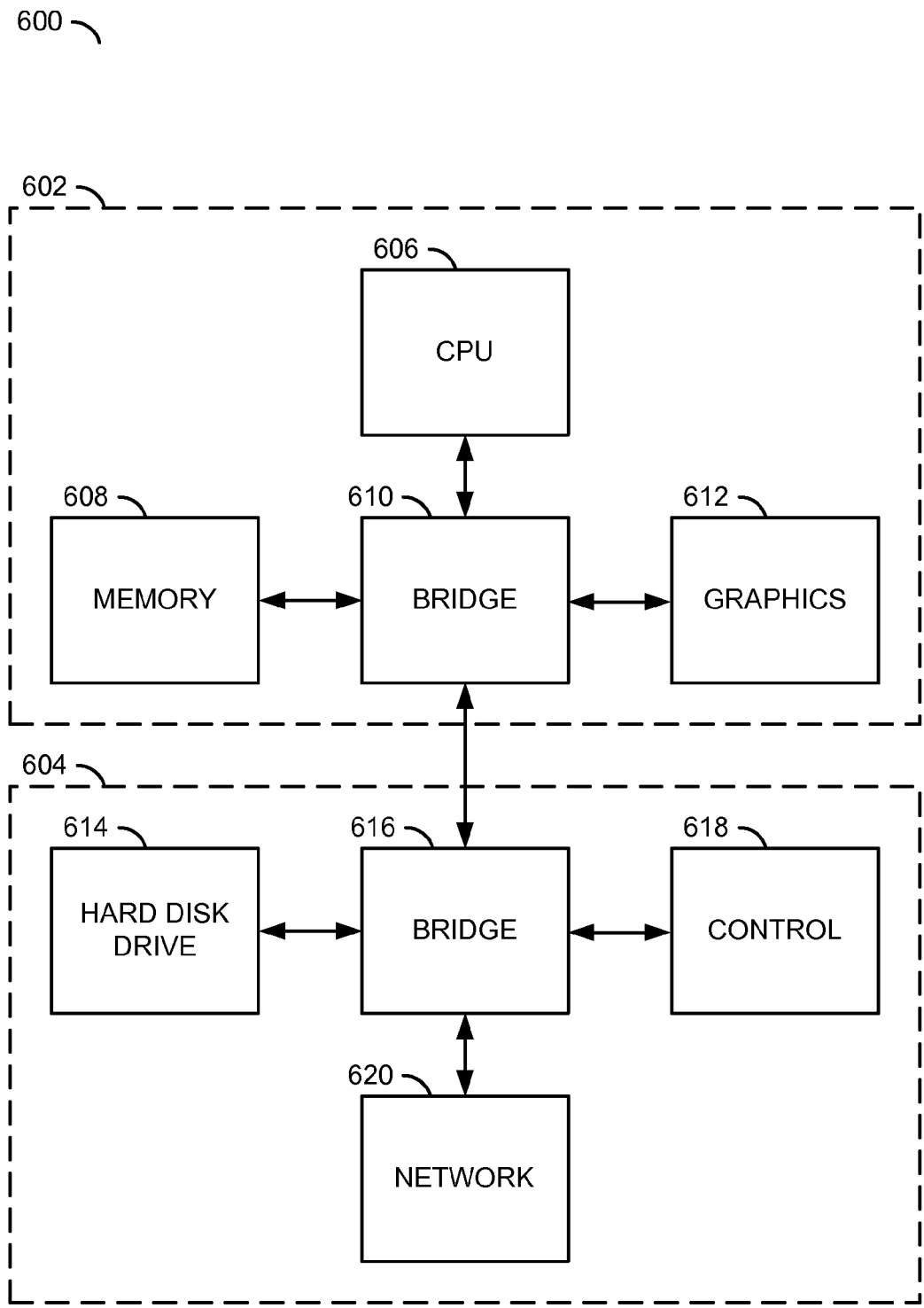
FIG. 10 is a computer system with hard disk drives.

Referring to FIG. 10, a computer system 600 with hard disk drives is shown. The system 600 may comprise a CPU subsystem circuit 602 and an I/O subsystem circuit 604. The circuit 602 generally comprises a CPU circuit 606, a memory circuit 608, a bridge circuit 610 and a graphics circuit 612. The circuit 604 generally comprises a hard disk drive 614, a bridge circuit 616, a control circuit 618 and a network circuit 620.

Figure 11:
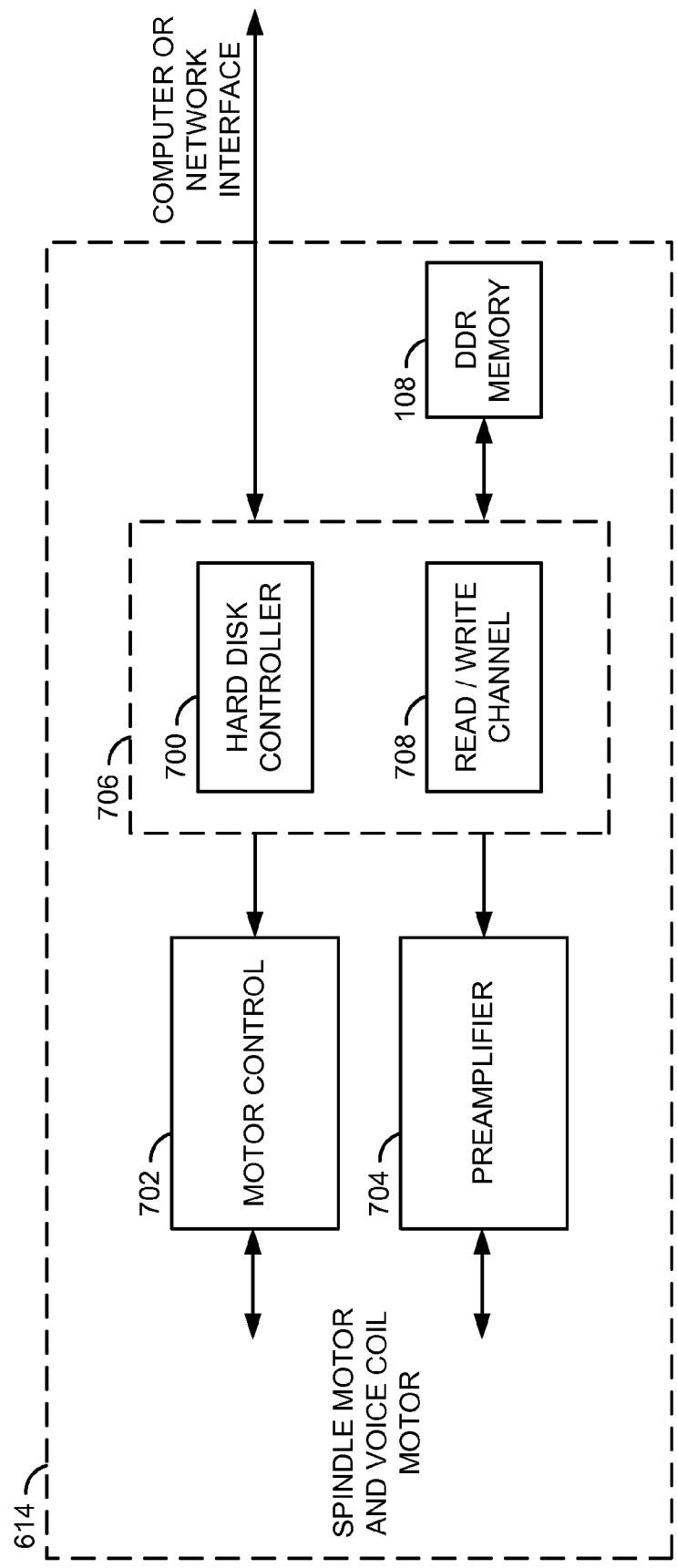
FIG. 11 is a block diagram of a hard disk drive.

Referring to FIG. 11, a block diagram of a hard disk drive 614 is shown. The hard disk drive 614 generally comprises the DDR memory circuit 108, a motor control circuit 702, a preamplifier circuit 704 and a system-on-chip circuit 706. The circuit 706 may comprise a hard disk controller circuit 700 and a read/write channel circuit 708. The hard disk controller circuit 700 may transfer data between a drive and a host during read/write. The hard disk controller circuit 700 may also provide servo control. The motor control circuit 702 may drive a spindle motor and a voice coil motor. The preamplifier circuit 704 may amplify signals to the read/write channel circuit 708 and for head write data.

Referring to FIG. 12, a block diagram of a hard disk controller 700 is shown. The hard disk controller 700 generally comprises the memory controller circuit 304, a host interface client circuit 802, a processor subsystem client circuit 804, a servo controller client circuit 806 and a disk formatter client circuit 808. In one example, the circuit 804 may be a dual ARM processor subsystem. The protocol engine circuit 106 located in the memory controller 304 may manage data movement between a data bus and host logic from the host interface client circuit 802. The host interface client circuit 802 may process commands from the protocol engine 106. The host interface client circuit 802 may also transfer data to and/or from the memory controller circuit 304 and the protocol engine 106. The disk formatter client circuit 808 may move data between the memory controller circuit 304 and media. The disk formatter client circuit 808 may also implement error correcting code (ECC). The processor subsystem client circuit 804 may configure the registers in the memory controller 304 and block 306 for the purpose of performing initialization and training sequences to the memory controller 304, the circuit 306, the memory 108 and/or the memory 316.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a first sub-arbiter circuit configured to determine a first winning channel from a plurality of channel requests based on a first criteria; and
a second sub-arbiter circuit configured to determine a second winning channel received from said plurality of channel requests based on a second criteria, wherein (a) said second sub-arbiter is configured to further prioritize the order of said first winning channel when determining said second winning channel by overriding said first winning channel if said second criteria creates a more efficient data transfer and (b) said second criteria of said second sub-arbiter circuit is different than said first criteria of said first sub-arbiter circuit to maintain consecutive read or write operations in a particular bank of a plurality of banks of a memory.

2. The apparatus according to claim 1, further comprising:
a channel router circuit configured to receive a signal defining said first channel received.

3. The apparatus according to claim 1, further comprising:
a memory circuit configured to receive said signal.

4. The apparatus according to claim 1, wherein said second sub-arbiter uses bank history to determine said second winning channel.

5. The apparatus according to claim 1, wherein said second sub-arbiter is configured to use a history of reads and writes to determine a subsequent winning channel.

6. The apparatus according to claim 1, wherein said first and said second sub-arbiter are configured to statistically trade off (i) client bandwidth, (ii) client latency, (iii) fairness and (iv) memory protocol efficiency for optimal performance.

7. The apparatus according to claim 2, wherein said plurality of channel requests are received from said channel router circuit.

8. The apparatus according to claim 1, wherein said first winning channel from said first sub-arbiter is presented to a protocol engine circuit.

9. The apparatus according to claim 1, wherein said second winning channel is a previous winner of said first sub-arbiter.

10. The apparatus according to claim 1, wherein said first criteria is based on a time slice priority set in a programmable register.

11. The apparatus according to claim 1, wherein said second criteria is based on assigning fairness thresholds to each of said plurality of channel requests.

12. The apparatus according to claim 1, wherein said first sub-arbiter and said second sub-arbiter determine simultaneously determine respective winning channels at a regular interval of one or more clock cycles.

13. An apparatus comprising:
an arbiter circuit configured to sort a first set of input requests received from a plurality of channels based on a first plurality of criteria, wherein (i) each combination of the sorting using the plurality of criteria generates a second set of requests based on the combinations of criteria, (ii) each said second set of requests is independently arbitrated by a first priority process to produce an intermediate winning channel for each of the combinations of criteria, (iii) each of the intermediate winning channels is used as a third set of requests which are arbitrated by a priority of the combinations of the said sorting of the said plurality of criteria to generate a final winning channel and (iv) said intermediate winning channels maintain consecutive read or write operations in a particular bank of a plurality of banks of a memory.

14. The apparatus according to claim 13, wherein said criteria includes one or more of fairness criteria, bank optimality criteria, and read/write optimality criteria.

15. The apparatus according to claim 14, wherein said apparatus has said priority of combinations orders bank optimality criteria as a first priority, fairness criteria as a second criteria, and read/write optimality as a third priority.

16. The apparatus according to claim 13, wherein said final winning channel always presents a result in response to any input requester.

17. The apparatus according to claim 13, wherein said apparatus presents an indication of latency based on which of the criteria the winning channel has.

18. The apparatus according to claim 1, wherein said second criteria maintains the same read/write direction as a previous winner within said particular bank of said plurality of banks of said memory.

19. The apparatus according to claim 1, wherein said second criteria implements directional organization of said plurality of banks of said memory.

* * * * *